US012322931B2

(12) United States Patent
Fujimura et al.

(10) Patent No.: US 12,322,931 B2
(45) Date of Patent: Jun. 3, 2025

(54) SPARK PLUG

(71) Applicant: NGK Spark Plug Co., LTD., Nagoya (JP)

(72) Inventors: Kengo Fujimura, Nagoya (JP); Syoma Tsumagari, Nagoya (JP); Soh Tohara, Nagoya (JP); Yuichi Yamada, Nagoya (JP)

(73) Assignee: NITERRA CO., LTD., Nagoya (JP)

( * ) Notice: Subject to any disclaimer, the term of this patent is extended or adjusted under 35 U.S.C. 154(b) by 157 days.

(21) Appl. No.: 17/998,995

(22) PCT Filed: Sep. 14, 2021

(86) PCT No.: PCT/JP2021/033631

§ 371 (c)(1),
(2) Date: Nov. 16, 2022

(87) PCT Pub. No.: WO2022/059658

PCT Pub. Date: Mar. 24, 2022

(65) Prior Publication Data

US 2023/0178968 A1 Jun. 8, 2023

(30) Foreign Application Priority Data

Sep. 16, 2020 (JP) ................................. 2020-155562

(51) Int. Cl.
*H01T 13/41* (2006.01)
*H01T 13/34* (2006.01)

(52) U.S. Cl.
CPC ............. *H01T 13/41* (2013.01); *H01T 13/34* (2013.01)

(58) Field of Classification Search
None
See application file for complete search history.

(56) References Cited

U.S. PATENT DOCUMENTS 6,160,342 A 12/2000 Nishikawa
6,334,800 B1 1/2002 Nishikawa et al.
(Continued)

FOREIGN PATENT DOCUMENTS

DE 102017217265 A1 3/2019
EP 0874432 A2 10/1998
(Continued)

OTHER PUBLICATIONS

International Search Report mailed Nov. 30, 2021 for the corresponding PCT International Patent Application No. PCT/JP2021/033631 (5 pages including English translation).
(Continued)

*Primary Examiner* — Srinivas Sathiraju
(74) *Attorney, Agent, or Firm* — Leason Ellis LLP; Melvin C. Garner; Mitsuhiro Haraguchi

(57) ABSTRACT

A spark plug includes a tubular metallic shell, a tubular insulator held in the metallic shell and having an axial hole, a center electrode held at one end of the axial hole, a metallic terminal member held at the other end of the axial hole, and a resistor element disposed between the center electrode and the metallic terminal member in the axial hole and containing glass and an electrically conductive material. The resistor element has a first resistor layer disposed on the center electrode side and closest to the center electrode and containing titanium oxide, and a second resistor layer disposed on the metallic terminal member side in relation to the first resistor layer and whose titanium oxide content is lower than that of the first resistor layer. The titanium oxide content decreases from the center electrode side toward the metallic terminal member side.

11 Claims, 6 Drawing Sheets

(56) References Cited

U.S. PATENT DOCUMENTS

| | | | | |
|---|---|---|---|---|
| 8,217,563 | B2 * | 7/2012 | Shibata | H01T 21/02 445/7 |
| 9,997,894 | B2 * | 6/2018 | Uegaki | H01T 13/40 |
| 10,211,604 | B2 * | 2/2019 | Tokumaru | H01T 13/34 |
| 10,931,087 | B2 * | 2/2021 | Kato | H01T 13/34 |
| 11,005,237 | B2 * | 5/2021 | Nakano | H01T 13/34 |
| 2005/0200255 | A1 * | 9/2005 | Yoshimoto | H01T 13/39 313/142 |
| 2011/0133626 | A1 * | 6/2011 | Shibata | H01T 21/02 445/7 |
| 2011/0248620 | A1 * | 10/2011 | Shibata | H01C 17/0652 313/141 |
| 2011/0285270 | A1 * | 11/2011 | Tanaka | H01T 13/39 313/141 |
| 2012/0126683 | A1 * | 5/2012 | Yoshida | C03C 8/02 313/141 |
| 2012/0186723 | A1 * | 7/2012 | Hattori | C04B 35/5618 156/89.12 |
| 2013/0026903 | A1 * | 1/2013 | Shibata | C22C 30/00 313/141 |
| 2013/0140975 | A1 * | 6/2013 | Yoshida | H01T 13/05 313/135 |
| 2013/0175922 | A1 * | 7/2013 | Yoshida | H01T 21/02 445/7 |
| 2013/0187531 | A1 * | 7/2013 | Yoshida | H01T 13/20 313/143 |
| 2013/0285534 | A1 * | 10/2013 | Ochiai | H01T 13/34 313/141 |
| 2014/0239798 | A1 * | 8/2014 | Sakakura | H01T 13/08 313/143 |
| 2014/0336035 | A1 * | 11/2014 | Takaoka | H01T 13/38 501/137 |
| 2015/0061485 | A1 * | 3/2015 | Yoshida | H01T 13/20 313/135 |
| 2015/0130345 | A1 | 5/2015 | Sakakura et al. | |
| 2015/0214697 | A1 * | 7/2015 | Yoshida | H01T 13/40 315/59 |
| 2015/0349498 | A1 * | 12/2015 | Takaoka | H01T 13/41 313/135 |
| 2016/0157332 | A1 * | 6/2016 | Ban | H05H 1/52 315/246 |
| 2016/0204580 | A1 * | 7/2016 | Yoshida | H01T 13/41 313/141 |
| 2016/0380411 | A1 * | 12/2016 | Uchiyama | H01T 21/02 445/7 |
| 2019/0020180 | A1 * | 1/2019 | Tokumaru | H01T 13/36 |
| 2019/0165548 | A1 * | 5/2019 | Kato | H01T 13/34 |
| 2019/0326733 | A1 * | 10/2019 | Fujimura | H01T 13/14 |
| 2020/0161838 | A1 | 5/2020 | Reinsch et al. | |
| 2020/0403386 | A1 * | 12/2020 | Nakano | H01T 13/34 |
| 2021/0013704 | A1 * | 1/2021 | Ban | H01T 21/02 |
| 2022/0060000 | A1 * | 2/2022 | Kimura | H01T 13/02 |
| 2022/0094141 | A1 * | 3/2022 | Saito | H01T 13/32 |
| 2023/0008031 | A1 * | 1/2023 | Shimada | H01T 13/36 |
| 2023/0178968 | A1 * | 6/2023 | Fujimura | H01T 13/41 315/58 |
| 2023/0268722 | A1 * | 8/2023 | Sanda | H01T 13/02 313/118 |
| 2024/0186769 | A1 * | 6/2024 | Sanda | H01T 13/32 |

FOREIGN PATENT DOCUMENTS

| | | | | |
|---|---|---|---|---|
| EP | 2717396 | A2 | 4/2014 | |
| JP | 11233232 | A | 8/1999 | |
| JP | 2005327743 | A * | 11/2005 | H01T 13/41 |
| JP | 2015118910 | A | 6/2015 | |
| JP | 2018032521 | A | 3/2018 | |

OTHER PUBLICATIONS

Japanese Office Action mailed Jan. 10, 2023 for the corresponding Japanese Patent Application No. 2022-517360 (6 pages including English translation).

Japanese Office Action mailed Mar. 30, 2023 for the corresponding Japanese Patent Application No. 2022-517360 (7 pages including English translation).

European Search Report mailed May 7, 2024 for the corresponding European Patent Application No. 21869345.5 (7 pages).

* cited by examiner

SPARK PLUG

CROSS-REFERENCE TO RELATED PATENT APPLICATIONS

This application is a U.S. National Phase Application under 35 U.S.C. § 371 of International Patent Application No. PCT/JP2021/033631 filed on Sep. 14, 2021 and claims the benefit of priority to Japanese Patent Application No. 2020-155562 filed on Sep. 16, 2020, the contents of all of which are incorporated herein by reference in their entireties. The International Application was published in Japanese on Mar. 24, 2022 as International Publication No. WO/2022/059658 under PCT Article 21(2).

FIELD OF THE INVENTION

The technique disclosed by the present specification relates to a spark plug.

BACKGROUND OF THE INVENTION

A known spark plug used for an internal combustion engine has a structure in which a metallic terminal member is fixedly inserted into one end portion of an axial hole of an insulator, a center electrode is fixedly inserted into the other end portion of the axial hole, and a resistor element is disposed between the metallic terminal member and the center electrode in the axial hole. The resistor element functions as an electrical resistor between the metallic terminal member and the center electrode, thereby suppressing generation of radio noise at the time of spark discharge.

When such a spark plug is used for a long period of time, the resistance of the resistor element increases gradually and ignition performance lowers. A technique for solving this problem has been proposed (see JP-A-2015-118910). In the proposed technique, an effect of suppressing an increase in resistance (electrical durability) is enhanced by adding titanium oxide ($TiO_2$) to the resistor element.

PRIOR ART DOCUMENT

Patent Document

Patent Document 1: JP-A-2015-118910

Problem to be Solved by the Invention

In recent years, reduction of size and/or displacement has been demanded for vehicular internal combustion engines, and supercharged engines are now used. Therefore, it is demanded that high voltage be applied to a spark plug, and that its resistor element have high electrical durability.

However, if the amount of titanium oxide added to the resistor element is increased for the purpose of enhancing electrical durability, its radio noise suppression effect deteriorates. In recent years, weight reduction has been demanded for vehicles for improving fuel efficiency, and the materials of some parts have been switched from metal materials to non-metal materials such as carbon fiber composite material. Since parts formed of non-metal materials have no shielding performance, there has been increasing demand for radio noise suppression performance of spark plugs themselves.

SUMMARY OF THE INVENTION

Means for Solving the Problem

A spark plug disclosed by the present specification comprises a tubular metallic shell; a tubular insulator held in the metallic shell and having an axial hole extending in an axial direction; a center electrode held at one end of the axial hole; a metallic terminal member held at the other end of the axial hole; and a resistor element disposed between the center electrode and the metallic terminal member in the axial hole and containing glass and an electrically conductive material, wherein the resistor element has a titanium oxide containing region which is disposed on a side toward the center electrode and closest to the center electrode and contains titanium oxide, and a titanium oxide reduced region which is disposed on a side toward the metallic terminal member in relation to the titanium oxide containing region and whose titanium oxide content is lower than that of the titanium oxide containing region or which contains no titanium oxide, so that, as a whole, the titanium oxide content of the resistor element decreases from the center electrode side toward the metallic terminal member side.

Effect of the Invention

The spark plug disclosed by the present specification can have electrical durability and radio noise suppression performance at the same time.

DETAILED DESCRIPTION OF THE INVENTION

Figure 1:
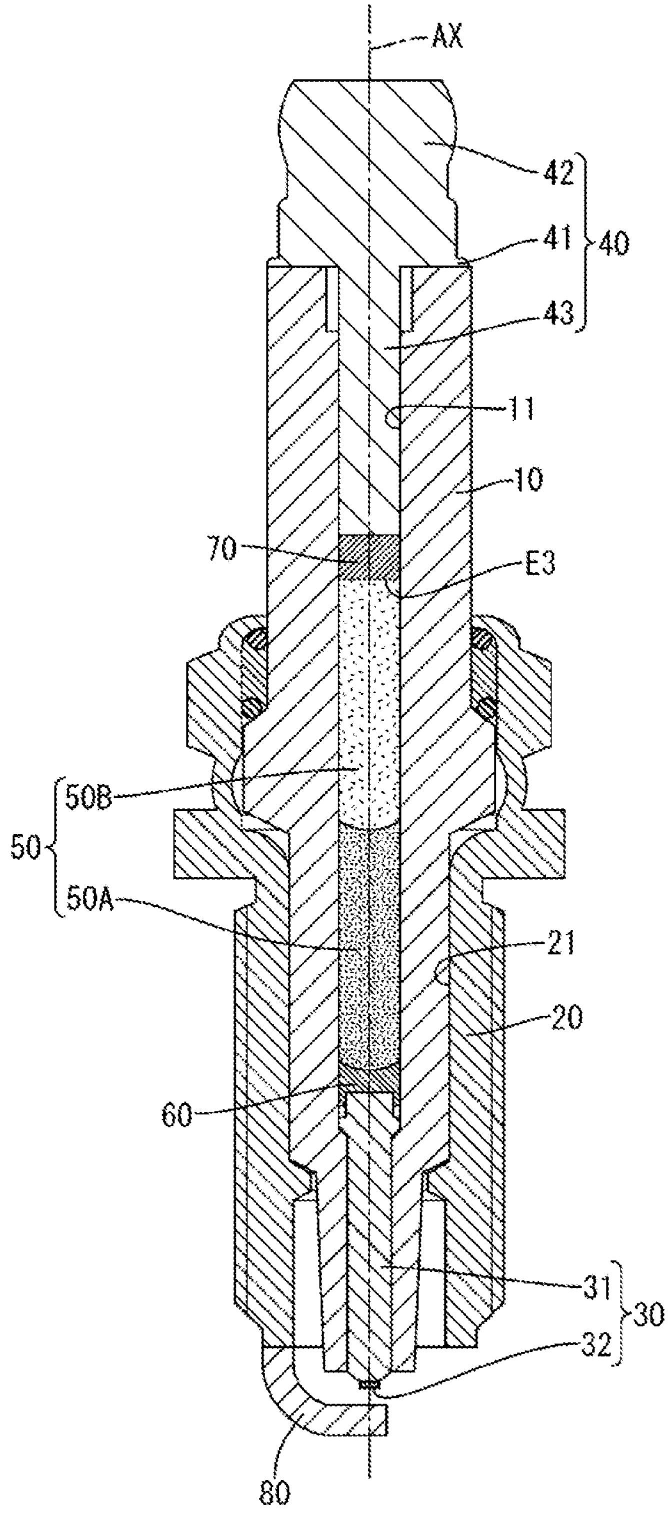
FIG. 1 is a sectional view of a spark plug of Embodiment 1.

Outline of Embodiments (1) A spark plug disclosed by the present specification comprises a tubular metallic shell; a tubular insulator held in the metallic shell and having an axial hole extending in an axial direction; a center electrode held at one end of the axial hole; a metallic terminal member held at the other end of the axial hole; and a resistor element disposed between the center electrode and the metallic terminal member in the axial hole and containing glass and an electrically conductive material, wherein the resistor element has a titanium oxide containing region which is disposed on a side toward the center electrode and closest to the center electrode and contains titanium oxide, and a titanium oxide reduced region which is disposed on a side toward the metallic terminal member in relation to the titanium oxide containing region and whose titanium oxide content is lower than that of the titanium oxide containing region or which contains no titanium oxide, so that, as a whole, the titanium oxide content of the resistor element decreases from the center electrode side toward the metallic terminal member side.

In the case where the resistor element has an increased resistance, melting of glass is observed mainly in a region of the resistor element on the center electrode side. Since the resistor element contains titanium oxide in this region, it is possible to suppress melting of glass, thereby enhancing electrical durability. Meanwhile, radio noise is likely to be generated from an end portion of the metallic shell on the metallic terminal member side. Since a region of the resistor element close to the metallic terminal member is the titanium oxide reduced region, an effect of suppressing radio noise (hereinafter referred to as "radio noise suppression effect") is maintained.

Notably, the expression "as a whole, the titanium oxide content decreases from the center electrode side toward the metallic terminal member side" encompasses both a case where the resistor element has a plurality of layers and the titanium oxide content decreases stepwise from the center electrode side toward the metallic terminal member side, and a case where the resistor element is not clearly divided into a plurality of layers and the titanium oxide content decreases continuously from the center electrode side toward the metallic terminal member side.

(2) In the above-described spark plug, the titanium oxide content of the titanium oxide containing region may be 1 mass % or more and 15 mass % or less.

When the titanium oxide content is 1 mass % or more, sufficient electrical durability can be obtained. When the titanium oxide content is 15 mass % or less, a sufficient radio noise suppression effect is maintained.

(3) In the above-described spark plug, the resistor element may have, as the titanium oxide reduced region, a titanium oxide free region which contains no titanium oxide.

Since the region of the resistor element closest to the metallic terminal member is a titanium oxide free region, radio noise can be suppressed further.

(4) In the above-described spark plug, the titanium oxide content of the resistor element may decrease stepwise from the center electrode side toward the metallic terminal member side.

Alternatively, in the above-described spark plug, the titanium oxide content of the resistor element may decrease gradually from the center electrode side toward the metallic terminal member side.

In the case of an extreme difference in titanium oxide content between the titanium oxide containing region and the titanium oxide reduced region, contact resistance is likely to be generated at the position of the boundary between the two regions, and in some cases, it becomes difficult to stabilize the resistance of the resistor element within a desired range. Since the titanium oxide content is changed stepwise or continuously from one end of the resistor element on the center electrode side toward the other end on the metallic terminal member side, generation of contact resistance is suppressed, and the resistance of the resistor element can be stabilized within the desired range.

(5) In the above-described spark plug, the titanium oxide containing region may have a length of 1 mm or more.

It is possible to secure electrical durability at a position in the resistor element closest to the center electrode.

(6) In the above-described spark plug, an end of the titanium oxide reduced region on the metallic terminal member side may be closer to the metallic terminal member than to the metallic shell.

It is possible to further suppress leakage of radio noise from an end portion of the metallic shell on the metallic terminal member side.

(7) In the above-described spark plug, the resistor element may contain only titanium oxide having a rutile-type crystal structure.

In the case where the crystal structure of titanium oxide contained in the resistor element is not the anatase type but the rutile type, it is possible to further enhance electrical durability.

Details of Embodiments

Specific examples of the technique disclosed by the present specification will now be described with reference to the drawings. Notably, the present invention is not limited to the illustrated examples and is shown by the claims. It is intended that the present invention encompasses all modifications within the meaning and scope equivalent to the claims.

Embodiment 1

Figure 2:
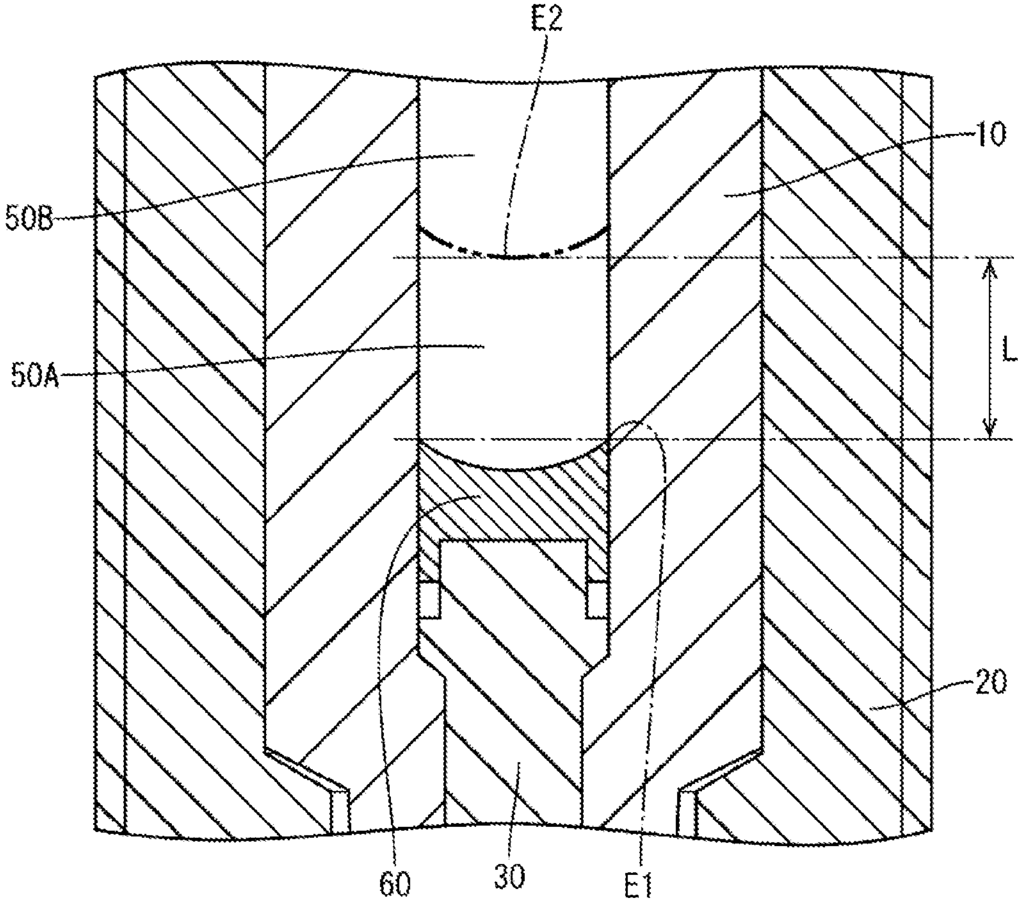
FIG. 2 is a schematic sectional view used for describing the axial length of a first resistor layer provided in the spark plug of Embodiment 1.
Figure 3:
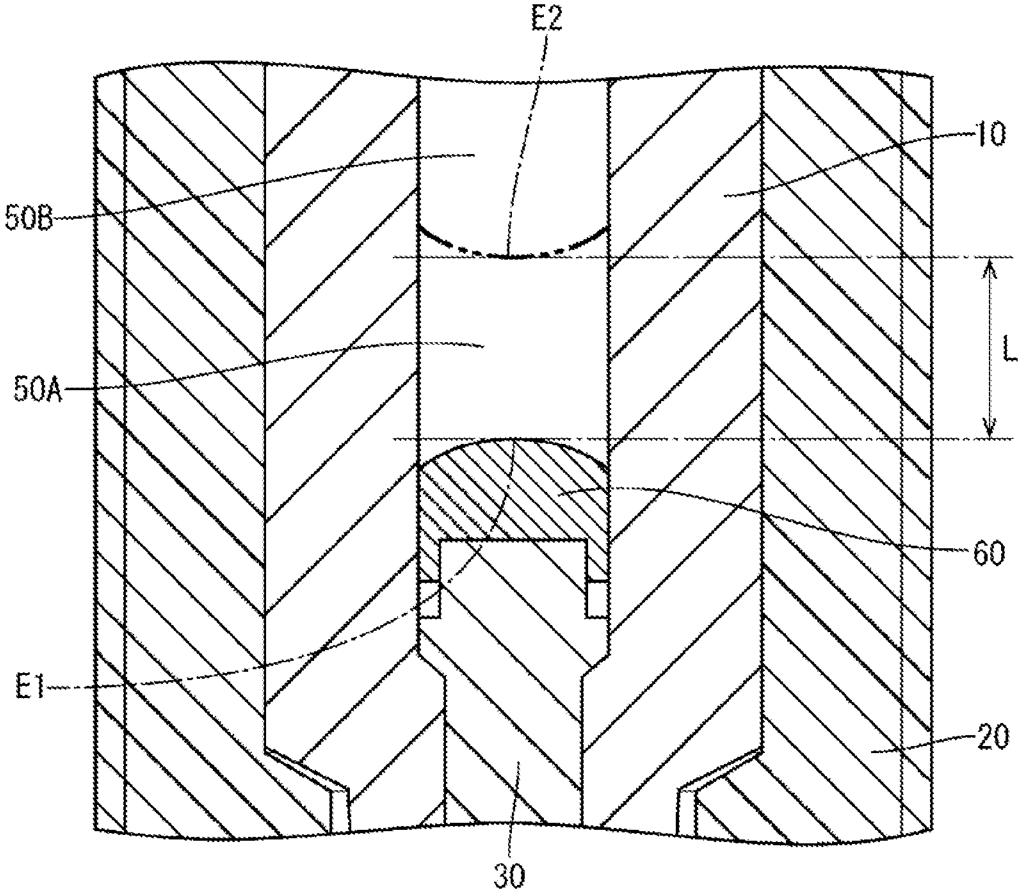
FIG. 3 is another schematic sectional view used for describing the axial length of the first resistor layer provided in the spark plug of Embodiment 1.

Embodiment 1 will be described with reference to FIG. 1 to FIG. 3. A spark plug 1 is attached to a cylinder head of an internal combustion engine and is used for igniting an air-fuel mixture within a combustion chamber of the internal combustion engine. As shown in FIG. 1, the spark plug 1 includes an insulator 10, a metallic shell 20, a center electrode 30, a metallic terminal member 40, a resistor element 50, seal members 60 and 70, and a ground electrode 80. An alternate long and short dash line of FIG. 1 shows an axial line AX of the spark plug 1. In the following description, a direction parallel to the axial line AX (the vertical direction in FIG. 1) will be referred to as the "axial direction." Also, the lower side in FIG. 1 will be referred to the forward end side of the spark plug 1, and the upper side in FIG. 1 will be referred to the rear end side of the spark plug 1.

<Insulator 10>

As shown in FIG. 1, the insulator 10 is an approximately cylindrical member which extends along the axial line AX and has an axial hole 11 formed therein and extending in the axial direction. The insulator 10 is formed by using, for example, a ceramic material such as alumina.

<Metallic Shell 20>

The metallic shell 20 is a member which is utilized when the spark plug 1 is attached to the cylinder head. As shown in FIG. 1, this metallic shell 20 has the shape of a cylinder extending in the axial direction, as a whole, and is formed of an electrically conductive metal material (for example, low carbon steel).

As shown in FIG. 1, the metallic shell 20 has a through hole 21 formed therein and penetrating the metallic shell 20 in the axial direction. The insulator 10 is held inside the metallic shell 20 in a state in which the insulator 10 is inserted into the through hole 21. A rear end of the insulator 10 projects from a rear end of the metallic shell 20 to the outside (the upper side of FIG. 1). A forward end portion of the insulator 10 projects from a forward end of the metallic shell 20 to the outside (the lower side of FIG. 1).

<Center Electrode 30>

As shown in FIG. 1, the center electrode 30 includes a rod-shaped center electrode body 31 extending along the axial direction, and a cylindrical columnar tip 32 attached to a forward end of the center electrode body 31. The center electrode body 31 is held in a forward-end-side portion of the axial hole 11 of the insulator 10 such that a forward end portion of the center electrode body 31 is exposed to the outside of the insulator 10. The center electrode body 31 is formed of nickel (Ni) or a nickel-based alloy which contains nickel in the largest amount (for example, NCF600, NCF601, or the like). Notably, the center electrode body 31 may have a two-layer structure including an outer layer portion (base material) formed of nickel or a nickel-based alloy and a core portion embedded in the outer layer portion. In this case, preferably, the core portion is formed of copper (Cu) which is more excellent in thermal conductivity than the outer layer portion or a copper-based alloy which contains copper in the largest amount. The main component of the tip 32 is a noble metal such as platinum, iridium, or the like. Notably, the tip 32 can be omitted.

<Metallic Terminal Member 40>

As shown in FIG. 1, the metallic terminal member 40 is a rod-shaped member extending in the axial direction and is held in a rear-end-side portion of the axial hole 11 of the insulator 10 such that a rear end portion of the metallic terminal member 40 is exposed to the outside of the insulator 10. The metallic terminal member 40 is disposed in the axial hole 11 to be located on the rear end side of the center electrode 30. The metallic terminal member 40 is formed of an electrically conductive metal material (for example, low carbon steel). The surface of the metallic terminal member 40 may be plated with nickel or the like for the purpose of, for example, corrosion prevention. The metallic terminal member 40 has a flange portion 41 formed at a predetermined position in the axial direction, a terminal connection portion 42 located on the rear end side of the flange portion 41, and a leg portion 43 located on the forward end side of the flange portion 41. The leg portion 43 is inserted into the axial hole 11 of the insulator 10. The terminal connection portion 42 is exposed to a space on the rear end side of the insulator 10. A plug cap to which an unillustrated high voltage cable is connected is attached to the terminal connection portion 42, and a high voltage for generation of discharge is applied to the terminal connection portion 42.

<Resistor Element 50>

As shown in FIG. 1, the resistor element 50 is disposed between a forward end of the metallic terminal member 40 and a rear end of the center electrode 30 within the axial hole 11 of the insulator 10. The resistor element 50 has a resistance of, for example, 1 kiloohm or greater (for example, 5 kiloohms) and has, for example, a function of reducing radio noise at the time of spark generation. The structure of the resistor element 50 will be described in detail later.

<Seal Members 60 and 70>

The electrically conductive seal member 60 is disposed in the axial hole 11 to be located between a forward end of the resistor element 50 and a rear end of the center electrode 30. Also, the electrically conductive seal member 70 is disposed in the axial hole 11 to be located between a rear end of the resistor element 50 and a forward end of the metallic terminal member 40. The seal members 60 and 70 are formed of a material having electrical conductivity, for example, a composition which contains particles of $B_2O_3$—$SiO_2$ glass or the like and particles of metal (Cu, Fe, or the like).

<Ground Electrode 80>

As shown in FIG. 1, the ground electrode 80 is bent midway to have an approximately L-like shape as a whole, and its rear end is joined to a forward end of the metallic shell 20. A distal end portion of the ground electrode 80 is disposed to face the tip 32 on the forward end of the center electrode 30 with a gap formed therebetween. The ground electrode 80 and the metallic shell 20 are joined to each other by means of, for example, resistance welding, laser welding, or the like. As a result, the ground electrode 80 and the metallic shell 20 are electrically connected to each other. The ground electrode 80 is formed of, for example, nickel or a nickel-based alloy.

A gap is present between the tip 32 on the forward end of the center electrode 30 and the distal end portion of the ground electrode 80. When a high voltage is applied between the center electrode 30 and the ground electrode 80, at the gap, spark discharge occurs generally along the axial line AX.

<Specific Structure of the Resistor Element 50>

The resistor element 50 is formed of a composition which contains glass particles (main component) and an electrically conductive material. For example, glass materials such as $B_2O_3$—$SiO_2$ glass, BaO—$B_2O_3$ glass, and $SiO_2$—$B_2O_3$—CaO—BaO glass can be employed as the material of the glass particles. For example, non-metal, electrically conductive materials such as carbon particles (for example, carbon black), TiC particles, and TiN particles or metals such as Al, Mg, Ti, Zr, and Zn can be employed as the electrically conductive material. The resistor element 50 of the present embodiment further contains titanium oxide particles.

The resistor element 50 has a two-layer structure and is composed of a first resistor layer 50A (one example of the titanium oxide containing region) disposed on a side toward the center electrode 30 (hereinafter referred to as the "center electrode 30 side"), and a second resistor layer 50B (one example of the titanium oxide reduced region) disposed on a side toward the metallic terminal member 40 (hereinafter referred to as the "metallic terminal member 40 side"). Both the first resistor layer 50A and the second resistor layer 50B contain titanium oxide. The titanium oxide content of the second resistor layer 50B, which is disposed to be closer to the metallic terminal member 40 than the first resistor layer 50A, is lower than that of the first resistor layer 50A.

Since the resistor element 50 contains titanium oxide, the resistance increase suppression effect (electrical durability) is enhanced. However, if the amount of titanium oxide added to the resistor element 50 is increased so as to enhance the electrical durability, its radio noise suppression effect lowers.

In the case where the resistor element has an increased resistance, melting of glass is observed mainly in a region of the resistor element 50 on the center electrode 30 side. This is because the region on the center electrode 30 side is closer to the combustion chamber of the internal combustion engine, and is more likely to become high temperature. Since the first resistor layer 50A containing titanium oxide is disposed in the region of the resistor element 50 on the center electrode 30 side, it is possible to suppress melting of glass, thereby enhancing the electrical durability. Meanwhile, radio noise is likely to leak from an end portion of the metallic shell 20 on the metallic terminal member 40 side. Since the second resistor layer 50B whose titanium oxide content is lower than that of the first resistor layer 50A is disposed in a region of the resistor element 50 near the metallic terminal member 40, the radio noise suppression effect is maintained.

It is preferred that the titanium oxide content of the first resistor layer 50A be 1 mass % or more. When the titanium oxide content is 1 mass % or more, sufficient electrical durability can be obtained. Also, it is preferred that the titanium oxide content of the first resistor layer 50A be 15 mass % or less. Even in the region of the resistor element 50 on the center electrode 30 side, when the titanium oxide content is excessively high, a concern about reduction of the radio noise suppression effect arises. When the titanium oxide content is 15 mass % or less in this region, a sufficient radio noise suppression effect is maintained.

It is preferred that the axial length L of the first resistor layer 50A be 1 mm or more, because, when the axial length L is 1 mm or more, sufficient electrical durability can be secured. The axial length L of the first resistor layer 50A is represented by a distance between an end E1 of the first resistor layer 50A on the center electrode 30 side and an end E2 of the first resistor layer 50A on the metallic terminal member 40 side. In the case where an end surface of the first resistor layer 50A on the center electrode 30 side (an interface between the first resistor layer 50A and the seal member 60) is flat and is orthogonal to the axial line AX, the end E1 of the first resistor layer 50A on the center electrode 30 side means that end surface. In the case where the end surface of the first resistor layer 50A on the center electrode 30 side is not flat or inclines to be oblique to the axial line AX, the end E1 of the first resistor layer 50A on the center electrode 30 side means a surface which is orthogonal to the axial line AX and contains a part of the end surface of the first resistor layer 50A on the center electrode 30 side, which part is closest to the location of the center of the first resistor layer 50A in the axial direction. For example, in the case where, as shown in FIG. 2, the end surface of the first resistor layer 50A on the center electrode 30 side is a concave surface whose central portion is concave toward the forward end side, the end E1 is a surface which contains the circumferential edge of the end surface and is orthogonal to the axial line AX. Also, in the case where, as shown in FIG. 3, the end surface of the first resistor layer 50A on the center electrode 30 side is a concave surface whose central portion bulges toward the rear end side, the end E1 is a surface which contains the central portion of the end surface and is orthogonal to the axial line AX. The same applies to the end E2 on the metallic terminal member 40 side.

As shown in FIG. 1, an end E3 of the second resistor layer 50B on the metallic terminal member 40 side is closer to the metallic terminal member 40 than to the metallic shell 20. As described above, radio noise is more likely to leak from the end portion of the metallic shell 20 on the metallic terminal member 40 side. Since the end E3 of the second resistor layer 50B on the metallic terminal member 40 side is closer to the metallic terminal member 40 than to the metallic shell 20, it is possible to effectively suppress leakage of radio noise from the end portion of the metallic shell 20 on the metallic terminal member 40 side.

Notably, in the case where the end surface of the second resistor layer 50B on the metallic terminal member 40 side (an interface between the second resistor layer 50B and the seal member 70) is flat and is orthogonal to the axial line AX, the end E3 of the second resistor layer 50B on the metallic terminal member 40 side means that end surface. Also, in the case where the end surface of the second resistor layer 50B on the metallic terminal member 40 side is not flat or inclines to be oblique to the axial line AX, the end E3 of the second resistor layer 50B on the metallic terminal member 40 side means a surface which is orthogonal to the axial line AX and contains a part of the end surface of the second resistor layer 50B on the metallic terminal member 40 side, which part is closest to the center electrode 30.

It is preferred that the resistor element 50 contain only titanium oxide having a rutile-type crystal structure. In the case where the crystal structure of titanium oxide contained in the resistor element is not an anatase type but a rutile type, it is possible to further enhance electrical durability.

<Process for Manufacturing the Spark Plug 1>

An example of a process for manufacturing the spark plug 1 having the above-described structure will now be described.

First, the center electrode 30 is inserted into the axial hole 11 from the rear end side. The center electrode 30 is held in a forward-end-side portion of the axial hole 11.

Next, the material powder for the seal member 60 is poured into the axial hole 11 from the rear end side so that the material powder fills a space around a rear end portion of the center electrode 30. Subsequently, the charged material powder for the seal member 60 is pre-compressed by using a press pin.

Next, the material powder for the first resistor layer 50A is poured into the axial hole 11 from the rear end side so that the material powder for the first resistor layer 50A is charged on the pre-compressed material powder for the seal member 60, followed by pre-compression. Next, the material powder for the second resistor layer 50B is poured into the axial hole 11 from the rear end side so that the material powder for the second resistor layer 50B is charged on the pre-compressed material powder for the first resistor layer 50A, followed by pre-compression. The material powder for the first resistor layer 50A contains a larger amount of titanium oxide than the material powder of the second resistor layer 50B does.

Next, the material powder for the seal member 70 is poured into the axial hole 11 from the rear end side so that the material powder for the seal member 70 is charged on the pre-compressed material powder for the second resistor layer 50B, followed by pre-compression.

Next, the metallic terminal member 40 is inserted into the axial hole 11 from the rear end side. The insulator 10 with the inserted metallic terminal member 40 is placed in an electric furnace, and the respective material powders of the seal members 60 and 70, the first resistor layer 50A, and the second resistor layer 50B are heated while being compressed by the metallic terminal member 40. The respective material powders are compressed and sintered, whereby the seal members 60 and 70, the first resistor layer 50A, and the second resistor layer 50B are formed.

Subsequently, necessary steps, such as attachment of the metallic shell 20, machining of the ground electrode 80, etc., are performed, whereby the spark plug 1 is completed.

Actions and Effects (1) The spark plug 1 of the present embodiment includes the resistor element 50, and this resistor element 50 includes the first resistor layer 50A which is disposed on the center electrode side and closest to the center electrode 30 and contains titanium oxide, and the second resistor layer 50B which is disposed on the metallic terminal member 40 side in relation to the first resistor layer 50A and whose titanium oxide content is lower than that of the first resistor layer 50A.

Since the first resistor layer 50A, which is a region of the resistor element 50 located on the center electrode 30 side, contains titanium oxide, it is possible to restrain melting of glass and enhance electrical durability. Meanwhile, since a region of the resistor element 50 located near the metallic terminal member 40 is the second resistor layer 50B whose titanium oxide concentration is lower than that of the first resistor layer 50A, the radio noise suppression effect of the resistor element 50 is maintained.

(2) The titanium oxide content of the first resistor layer 50A is 1 mass % or more and 15 mass % or less. Since the titanium oxide content is 1 mass % or more, sufficient electrical durability can be obtained. Since the titanium oxide content is 15 mass % or less, a sufficient radio noise suppression effect is maintained.

(3) The length L of the first resistor layer 50A is 1 mm or greater. Electrical durability can be secured at a position in the resistor element 50 closest to the center electrode 30.

(4) The end E3 of the second resistor layer SOB on the metallic terminal member 40 side is closer to the metallic terminal member 40 than to the metallic shell 20. It is possible to further restrain leakage of radio noise from the end of the metallic shell 20 on the metallic terminal member 40 side.

(5) The resistor element 50 contains only titanium oxide having a rutile-type crystal structure. In the case where the crystal structure of titanium oxide contained in the resistor element is not an anatase type but a rutile type, it is possible to further enhance electrical durability.

Embodiment 2

Figure 4:
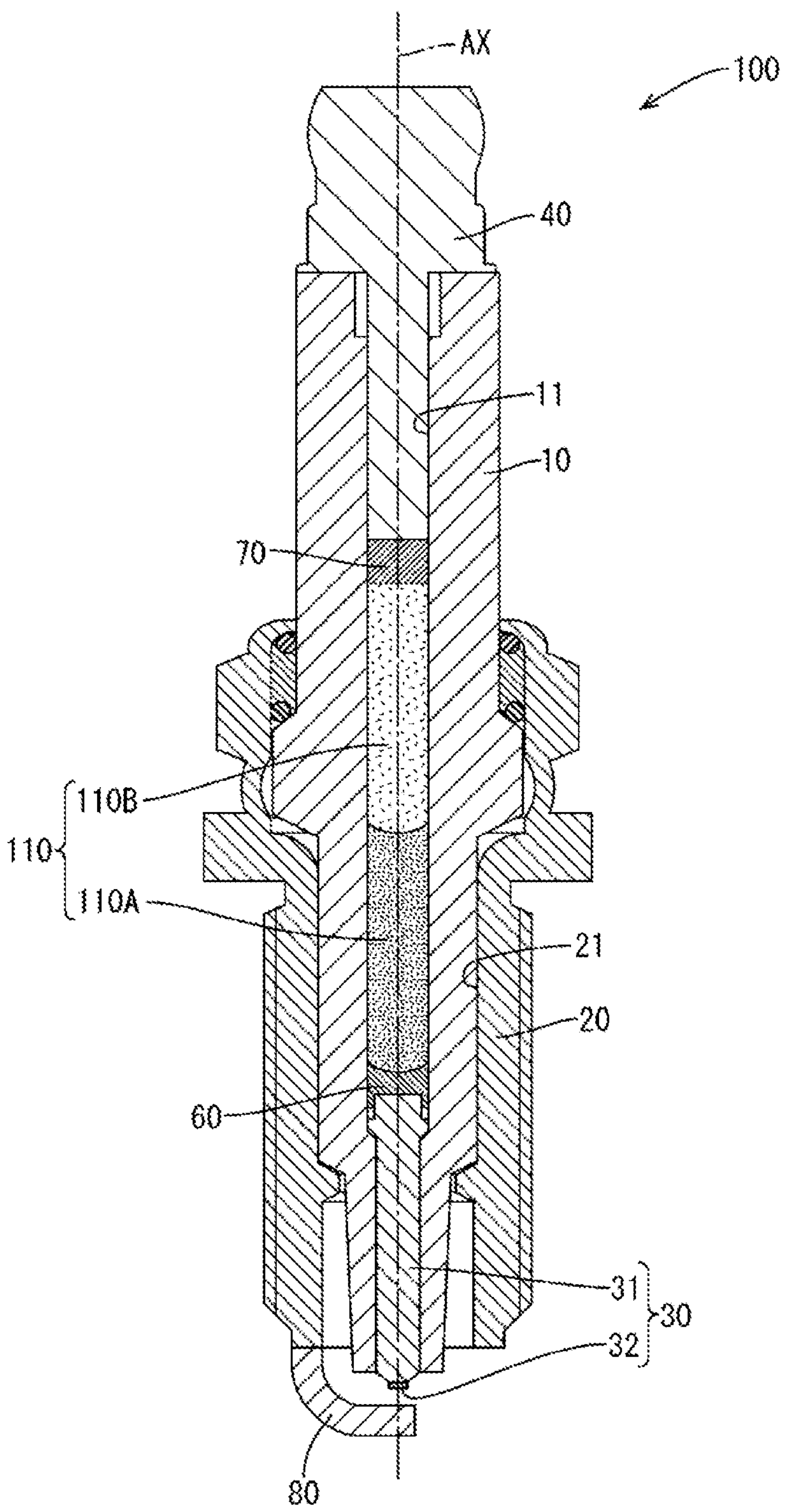
FIG. 4 is a sectional view of a spark plug of Embodiment 2.

Next, Embodiment 2 will be described with reference to FIG. 4. A spark plug 100 of the present embodiment includes a resistor element 110 whose configuration differs from that of Embodiment 1. In the present embodiment, components similar to those of Embodiment 1 are denoted by the same reference numerals, and their descriptions will not be repeated.

As in the case of Embodiment 1, the resistor element 110 is disposed in the axial hole 11 to be located between the forward end of the metallic terminal member 40 and the rear end of the center electrode 30 and is formed of a composition which contains glass particles (main component) and an electrically conductive material. The resistor element 110 has a two-layer structure and is composed of a first resistor layer 110A (one example of the titanium oxide containing region) disposed on the center electrode 30 side, and a second resistor layer 110B (one example of the titanium oxide reduced region and the titanium oxide free region) disposed on the metallic terminal member 40 side. The first resistor layer 110A contains titanium oxide. The second resistor layer 110B does not contain titanium oxide. In the present specification, the expression "does not contain titanium oxide" means not only that titanium oxide is not contained at all but also that titanium oxide is present in an amount equal to or less than a detectable amount as an impurity. Notably, detection of titanium oxide in the resistor element can be performed by investigating the presence/absence of titanium by performing, for example, element analysis by EDS (Energy dispersive X-ray spectroscopy).

As described above, in the present embodiment as well, actions and effects similar to those of Embodiment 1 are achieved. In particular, radio noise can be suppressed further by forming the region of the resistor element 110 on the metallic terminal member 40 side to be the second resistor layer 110B which does not contain titanium oxide.

Embodiment 3

Figure 5:
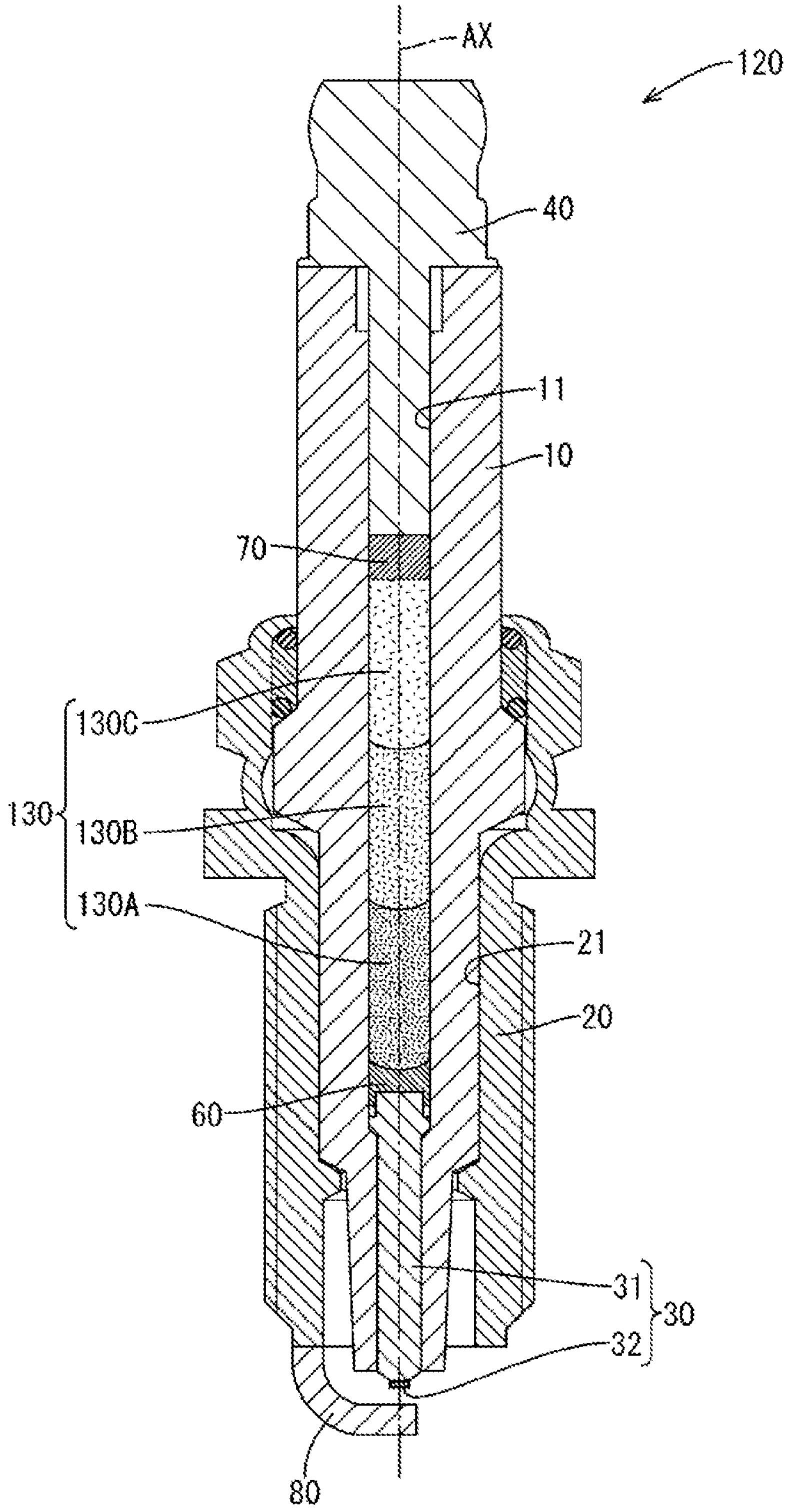
FIG. 5 is a sectional view of a spark plug of Embodiment 3.

Next, Embodiment 3 will be described with reference to FIG. 5. A spark plug 120 of the present embodiment includes a resistor element 130 whose configuration differs from that of Embodiment 1. In the present embodiment, components similar to those of Embodiment 1 are denoted by the same reference numerals, and their descriptions will not be repeated.

As in the case of Embodiment 1, the resistor element 130 is disposed in the axial hole 11 to be located between the forward end of the metallic terminal member 40 and the rear end of the center electrode 30 and is formed of a composition which contains glass particles (main component) and an electrically conductive material. The resistor element 130 has a three-layer structure in which a first resistor layer 130A (one example of the titanium oxide containing region), a second resistor layer 130B (one example of the titanium oxide reduced region), and a third resistor layer 130C (one example of the titanium oxide reduced region), which are disposed in this order from the forward end side.

The titanium oxide content of the resistor element 130 decreases stepwise from the center electrode 30 side toward the metallic terminal member 40 side. More specifically, the first resistor layer 130A located closest to the center electrode 30 contains the largest amount of titanium oxide. The second resistor layer 130B and the third resistor layer 130C, which are located on the side toward metallic terminal member 40 in relation to the first resistor layer 130A, are lower in titanium oxide content than the first resistor layer 130A. Of these two layers, the third resistor layer 130C, which is closer to the metallic terminal member 40, is lower in titanium oxide content than the second resistor layer 130B.

In the case where an extremely large difference in titanium oxide content is present between the titanium oxide containing region and the titanium oxide reduced region, contact resistance is likely to be generated at the position of the boundary between the two regions, and it may become difficult to stabilize the resistance of the resistor element within a desired range. By changing the titanium oxide content stepwise in the resistor element 130 from the center electrode 30 side toward the metallic terminal member 40 side, it is possible to restrain generation of contact resistance and stabilize the resistance of the resistor element 130 within the desired range.

Embodiment 4

Figure 6:
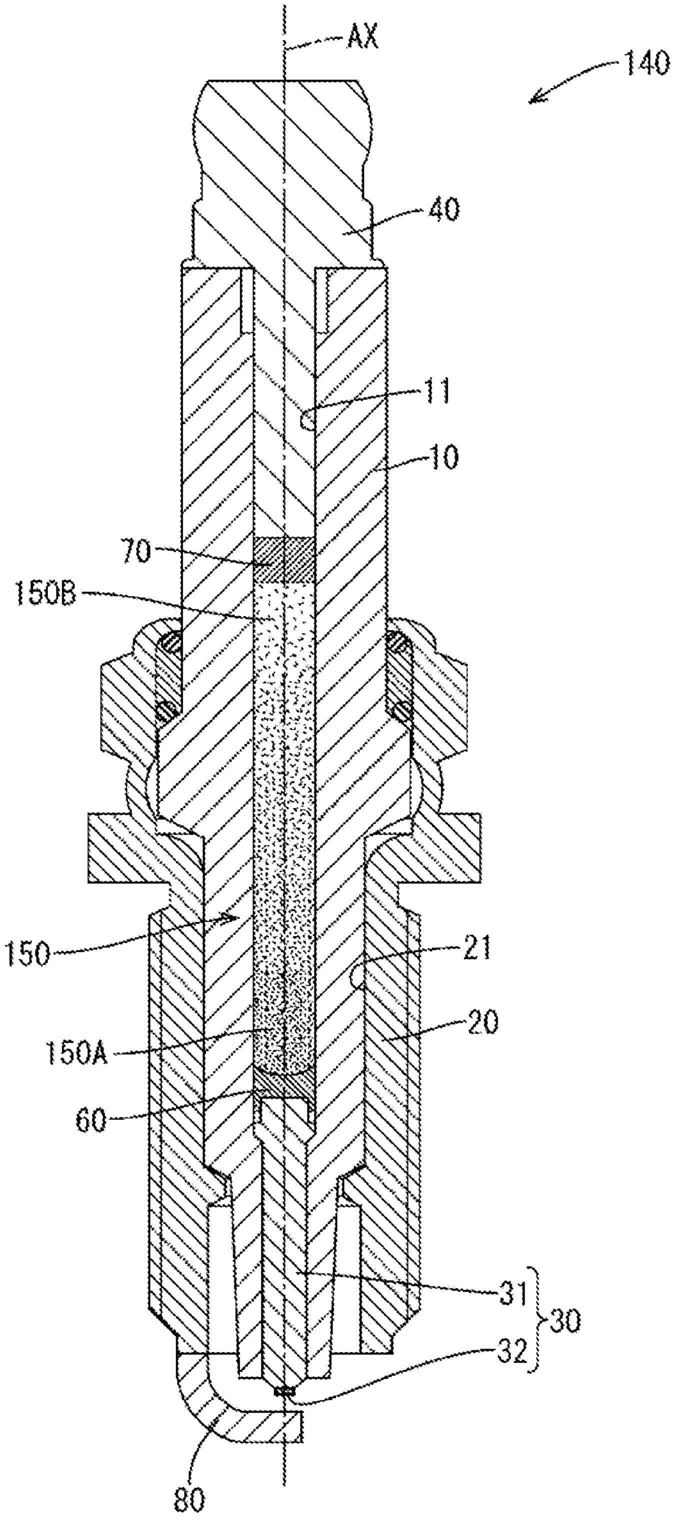
FIG. 6 is a sectional view of a spark plug of Embodiment 4.

Next, Embodiment 4 will be described with reference to FIG. 6. A spark plug 140 of the present embodiment includes a resistor element 150 whose configuration differs from that of Embodiment 1. In the present embodiment, components similar to those of Embodiment 1 are denoted by the same reference numerals, and their descriptions will not be repeated.

As in the case of Embodiment 1, the resistor element 150 is disposed in the axial hole 11 to be located between the forward end of the metallic terminal member 40 and the rear end of the center electrode 30 and is formed of a composition which contains glass particles (main component) and an electrically conductive material. The resistor element 150 is formed in such a manner that its titanium oxide content decreases continuously from the center electrode 30 side toward the metallic terminal member 40 side. Although no boundary position can be determined clearly, in the resistor element 150, a region on the center electrode 30 side is a titanium oxide containing region 150A, and a region on the metallic terminal member 40 side is a titanium oxide reduced region 150B. By changing the titanium oxide content continuously in the resistor element 130 from the center electrode 30 side toward the metallic terminal member 40 side, it is possible to restrain generation of contact resistance and stabilize the resistance of the resistor element 150 within the desired range.

Test Examples

1. Test example in which the relation between the content of titanium oxide and the load life characteristic (electrical durability) and radio noise characteristic of the resistor element was investigated.

1) Test Samples

A plurality of spark plugs having the same structure as the above-described Embodiment 1 were prepared and were used as test samples. The resistor element provided in each test sample was formed to have a two-layer structure having a resistor layer 1 disposed on the forward end side (the center electrode side) and a resistor layer 2 disposed on the rear end side (the metallic terminal member side). Table 1 shows the compositions of the resistor layer 1 and the resistor layer 2 for each test sample. Notably, the test samples were prepared to have the same structure except that the compositions of the resistor layer 1 and the resistor layer 2 of the resistor element were varied among the test samples.

The titanium oxide contents of the resistor layer 1 and the resistor layer 2 were determined by performing element analysis of the resistor layers 1 and 2 by EDS and converting measured titanium contents to titanium oxide contents. Measurement for the element analysis was performed by using a scanning electron microscope JSM-IT300 (product of JEOL Ltd.). In the measurement, scanning was performed along the axial line of the spark plug within an area of 300 micrometers×300 micrometers.

2) Load Life Test

A load life test was performed for each test sample. The load life test was performed for 60 hours on the basis of the test conditions prescribed in 7.14 of JIS B8031:2006 (internal combustion engine—spark plug), and a percentage change between the resistance before the test and the resistance after the test was calculated. In the case where the percentage change of the resistance of a test sample was greater than ±50%, the electrical durability of that test sample was determined to be insufficient, which is indicated as “X” in Table 1. In the case where the percentage change of the resistance of a test sample was not greater than ±50% and was greater than 30%, the electrical durability of that test sample was determined to be sufficient, which is indicated as “0” in Table 1. In the case where the percentage change of the resistance of a test sample was ±30% or less, that test sample was determined to be more excellent in electrical durability, which is indicated as “00” in Table 1.

3) Radio Noise Test

A radio noise test was performed for each test sample. The radio noise test was performed on the basis of a method prescribed in JASO (Japanese Automobile Standards Organization) D-002-2 (“Automobile—Radio wave noise characteristic—Second section: Measurement method for a preventor (Box method)). In the test, noise attenuation in a range of 30 MHz to 1000 MHz was measured. In the case where the noise attenuation of a test sample was less than 20 dB, the radio noise suppression performance of that test sample was determined to be insufficient, which is indicated as “X” in Table 1. In the case where the noise attenuation of a test sample was not less than 20 dB and was not greater than 30 dB, the radio noise suppression performance of that test sample was determined to be sufficient, which is indicated as “O” in Table 1. In the case where the noise attenuation of a test sample was 30 dB or greater, that test sample was determined to be more excellent in radio noise suppression performance, which is indicated as “OO” in Table 1.

TABLE 1

| | Composition of resistor layer 1 (mass %) | | | Composition of resistor layer 2 (mass %) | | | Electrical | Radio noise suppression |
|---|---|---|---|---|---|---|---|---|
| | SiO2 | TiO2 | Others | SiO2 | TiO2 | Others | durability | performance |
| Test sample 1 | 80 | 0 | 20 | 80 | 1 | 19 | X | ○○ |
| Test sample 2 | 80 | 0.5 | 19.5 | 80 | 1 | 19 | X | ○○ |
| Test sample 3 | 80 | 0.9 | 19.1 | 80 | 1 | 19 | X | ○○ |
| Test sample 4 | 80 | 5 | 15 | 80 | 1 | 19 | ○○ | ○○ |
| Test sample 5 | 80 | 7 | 13 | 80 | 1 | 19 | ○○ | ○○ |
| Test sample 6 | 80 | 13 | 7 | 80 | 1 | 19 | ○○ | ○○ |
| Test sample 7 | 80 | 15 | 5 | 80 | 1 | 19 | ○○ | ○○ |
| Test sample 8 | 80 | 1 | 19 | 80 | 0 | 20 | ○ | ○○ |
| Test sample 9 | 80 | 5 | 15 | 80 | 0 | 20 | ○○ | ○○ |
| Test sample 10 | 80 | 13 | 7 | 80 | 0 | 20 | ○○ | ○○ |
| Test sample 11 | 80 | 16 | 4 | 80 | 0 | 20 | ○○ | ○ |

4) Results

Table 1 shows that Test samples 1, 2, and 3 in which the titanium oxide content of the resistor layer 1 was smaller than that of the resistor layer 2 were excellent in radio noise suppression performance but their electrical durability were insufficient. It was confirmed that Test samples 4 to 11 in which the titanium oxide content of the resistor layer 1 was greater than that of the resistor layer 2 had sufficient electrical durability and sufficient radio noise suppression performance. A comparison among Test samples 4 to 11 reveals that Test samples 4 to 10 in which the titanium oxide content was 15 mass % or less were more excellent in radio noise suppression performance than Test sample 11 in which the titanium oxide content was greater than 15 mass %. From the above, it was confirmed that, when the titanium oxide content of the resistor layer 1 is greater than that of the resistor layer 2, electrical durability and radio noise suppression performance can be obtained at the same time and it was also confirmed that, when the titanium oxide content of the resistor layer 1 is 1 mass % or more and 15 mass % or less, more excellent radio noise suppression performance can be obtained.

2. Test example in which the relation between the length of the titanium oxide containing region and the load life characteristic (electrical durability) of the resistor element was investigated.

1) Test Samples

A plurality of spark plugs were prepared and used as test samples, with Test sample 5 of the above-described Embodiment 1 used as a reference, such that the length of the resistor layer 1 varied among the spark plugs. The test samples have the same structure except that the lengths of the resistor layers 1 and 2 in the resistor element are varied among the spark plugs. Table 2 shows the length of the resistor layer 1 of the resistor element disposed on the forward end side (on the center electrode side) for each test sample. Notably, Test sample 26 is identical to Test sample 4 in the embodiment.

2) Load Life Test

In a manner similar to the manner described in subsection 2) of the above-described section 1, a load life test was performed. Table 2 shows the results of the load life test.

TABLE 2

| | Length of resistor layer 1 (mm) | Electrical durability |
|---|---|---|
| Test sample 21 | 0.5 | ○ |
| Test sample 22 | 0.8 | ○ |
| Test sample 23 | 0.9 | ○ |
| Test sample 24 | 1 | ○○ |
| Test sample 25 | 1.5 | ○○ |
| Test sample 26 | 5 | ○○ |
| Test sample 27 | 9 | ○○ |
| Test sample 28 | 11 | ○○ |
| Test sample 29 | 13 | ○○ |
| Test sample 30 | 16 | ○○ |
| Test sample 31 | 19 | ○○ |
| Test sample 32 | 20 | ○○ |

3) Results

The results show that Test samples 24 to 32 in which the length of the resistor layer 1 is 1 mm or greater are more excellent in electrical durability than Test samples 21, 22, and 23 in which the length of the resistor layer 1 is less than 1 mm.

Other Embodiments (1) In Embodiments 1 and 2, the resistor element 50 has a two-layer structure, and in Embodiment 3, the resistor element 130 has a three-layer structure. However, the resistor element may have four or more layers. In this case, the layer which is closest to the center electrode is a titanium oxide containing region, and the remaining layers are titanium oxide reduced regions.

(2) In Embodiment 3, the resistor element 130 does not have any titanium oxide free region. However, the layer which is closest to the metallic terminal member may be a titanium oxide free region. This also applies to the case where the resistor element has four or more layers.

(3) In the case where the titanium oxide content decreases continuously from the center electrode side toward the metallic terminal member side as in Embodiment 4, a region of the resistor element closest to the metallic terminal member may be a titanium oxide free region or may not be a titanium oxide free region.

DESCRIPTION OF REFERENCE NUMERALS

1, 100, 120, 140: spark plug
10: insulator
11: axial hole
20: metallic shell
30: center electrode
40: metallic terminal member
50: resistor element
50A, 110A, 130A: first resistor layer (titanium oxide containing region)
50B, 130B: second resistor layer (titanium oxide reduced region)
110B: second resistor layer (titanium oxide reduced region, titanium oxide free region)
130C: third resistor layer (titanium oxide reduced region)
150A: titanium oxide containing region
150B: titanium oxide reduced region

The invention claimed is:

1. A spark plug comprising:
a tubular metallic shell;
a tubular insulator held in the metallic shell and having an axial hole extending in an axial direction;
a center electrode held at one end of the axial hole;
a metallic terminal member held at the other end of the axial hole;
a resistor element disposed between the center electrode and the metallic terminal member in the axial hole and containing glass and an electrically conductive material; and
two seal members between which the resistor element is disposed, wherein
the resistor element has:
a titanium oxide containing region which is disposed on a side toward the center electrode and closest to the center electrode and contains titanium oxide; and
a titanium oxide reduced region which is disposed on a side toward the metallic terminal member in relation to the titanium oxide containing region and whose titanium oxide content is lower than that of the titanium oxide containing region or which contains no titanium oxide, and
as a whole, the titanium oxide content of the resistor element decreases from the center electrode side toward the metallic terminal member side.

2. The spark plug according to claim 1, wherein the titanium oxide content of the titanium oxide containing region is 1 mass % or more and 15 mass % or less.

3. The spark plug according to claim 1, wherein the resistor element has, as the titanium oxide reduced region, a titanium oxide free region which contains no titanium oxide.

4. The spark plug according to claim 1, wherein the titanium oxide content of the resistor element decreases stepwise from the center electrode side toward the metallic terminal member side.

5. The spark plug according to claim 1, wherein the titanium oxide content of the resistor element decreases gradually from the center electrode side toward the metallic terminal member side.

6. The spark plug according to claim 1, wherein the titanium oxide containing region has a length of 1 mm or more.

7. The spark plug according to claim 1, wherein an end of the titanium oxide reduced region on the metallic terminal member side is closer to the metallic terminal member than to the metallic shell.

8. A spark plug according to claim 1, wherein the resistor element contains only titanium oxide having a rutile-type crystal structure.

9. The spark plugs according to claim 1, further comprising:
another titanium oxide reduced region that contains less titanium oxide than that of the titanium oxide reduced region, wherein the contents of titanium oxide in the resistor element decreases stepwise from the center electrode side toward the metallic terminal member side.

10. The spark plugs according to claim 9, wherein the other titanium oxide reduced region is located between the titanium oxide reduced region and the metallic terminal member.

11. The spark plugs according to claim 1, wherein the titanium oxide reduced region contains titanium oxide.

* * * * *